US007152695B2

(12) United States Patent
Happ et al.

(10) Patent No.: US 7,152,695 B2
(45) Date of Patent: Dec. 26, 2006

(54) POWER TOOL WITH AIR SEAL AND VIBRATION DAMPENER

(75) Inventors: Kenneth C. Happ, Burlington, WI (US); Anil P. Ghode, Libertyville, IL (US); Ray D. Derome, Twin Lakes, WI (US); Martin S. Scolaro, Burlington, WI (US)

(73) Assignee: Snap-on Incorporated, Kenosha, WI (US)

( * ) Notice: Subject to any disclaimer, the term of this patent is extended or adjusted under 35 U.S.C. 154(b) by 392 days.

(21) Appl. No.: 10/251,521

(22) Filed: Sep. 20, 2002

(65) Prior Publication Data

US 2004/0216907 A1 Nov. 4, 2004

(51) Int. Cl.
*H02K 9/00* (2006.01)

(52) U.S. Cl. .................... 173/217; 173/210; 173/93.6; 173/162.1; 310/50; 310/51

(58) Field of Classification Search ................ 173/210, 173/217, 83.5, 83.6, 170–171, 162.1; 310/50–51, 310/89, 90, 91; 227/217, 93.5, 210, 162.2
See application file for complete search history.

(56) References Cited

U.S. PATENT DOCUMENTS

| | | | | |
|---|---|---|---|---|
| 2,155,082 | A | 4/1939 | Galloway et al. | |
| 4,574,471 | A * | 3/1986 | Dibbern et al. | 310/50 |
| 4,648,579 | A | 3/1987 | Wilson | |
| 4,905,772 | A * | 3/1990 | Honsa et al. | 173/162.1 |
| 5,213,017 | A | 5/1993 | Jones et al. | |
| 5,394,039 | A * | 2/1995 | Suchdev et al. | 173/162.2 |
| 5,533,704 | A | 7/1996 | Fischinger et al. | |
| 5,642,008 | A * | 6/1997 | McCracken | 310/50 |
| 5,875,562 | A * | 3/1999 | Fogarty | 34/97 |
| 6,021,993 | A | 2/2000 | Kirkwood | |
| 6,043,575 | A | 3/2000 | Ghode et al. | |
| 6,045,112 | A | 4/2000 | Kirkwood | |
| 6,227,901 | B1 | 5/2001 | Pupkiewicz et al. | |
| 6,329,730 | B1 | 12/2001 | Neckermann et al. | |
| 6,394,191 | B1 | 5/2002 | Nakane | |
| 6,424,887 | B1 | 7/2002 | Allaei | |
| 6,619,527 | B1 * | 9/2003 | Moeller | 227/10 |
| 6,634,439 | B1 * | 10/2003 | Driessen | 173/217 |
| 6,672,402 | B1 * | 1/2004 | Ortt et al. | 173/1 |
| 6,886,643 | B1 * | 5/2005 | Riley et al. | 173/217 |
| 2001/0048258 | A1 | 12/2001 | Cook et al. | |
| 2002/0005290 | A1 | 1/2002 | Giardino et al. | |
| 2002/0079420 | A1 | 6/2002 | Arnold et al. | |
| 2002/0096341 | A1 | 7/2002 | Hagan et al. | |

FOREIGN PATENT DOCUMENTS

| | | |
|---|---|---|
| DE | 400861 | 7/1991 |
| EP | 0274607 | 7/1988 |
| EP | 0873824 | 10/1998 |

* cited by examiner

*Primary Examiner*—Stephen F. Gerrity
*Assistant Examiner*—Michelle Lopez
(74) *Attorney, Agent, or Firm*—Seyfarth Shaw LLP

(57) ABSTRACT

A power tool is provided including a resilient boot having a radial flange mounted in a seat formed by housing halves in order to provide a sealed barrier segregating air of an inlet vent of a motor from air of an exhaust vent and the boot also mounting the motor and providing vibration dampening between the motor and the housing halves. The boot and housing also include wire management slots and the boot absorbs tolerance stack-up of components and provides shock absorption when the power tool is dropped.

52 Claims, 3 Drawing Sheets

POWER TOOL WITH AIR SEAL AND VIBRATION DAMPENER

BACKGROUND

The present application relates to power tools, and more particularly, to power tools with a structure for providing an air seal and vibration dampening.

Electric motors disposed in the tool housing of electric power tools function better when vibration dampening structures are provided. As well, the motors function better and the tools are easier to use when the air used and created by the motor is managed properly. Tool housings of electric power tools have included air inlet ports to suck air into the motor for cooling and air exhaust ports to exhaust the air which has been warmed. In prior tools, not all air from the tool was vented to the atmosphere. Instead, some of the air was allowed to flow to other portions within the housing of the tool such as the trigger or the handle. The failure to manage the air properly within the tool increases the temperature of the trigger or handle making them uncomfortable and decreasing the life of the trigger switch. Also, some of the non-vented air may be re-sucked into the motor, making the brushes of the motor hotter and decreasing their life.

Previous attempts to solve these problems included air deflectors formed within the housing which included inwardly projecting walls which extended toward the interior surface of the tool housing. However, these inwardly projecting walls still allowed for slight gaps between the ends of the walls and the interior surface of the power tool housing. Therefore, such deflectors could not provide for an airtight seal between the deflector and the interior surface of the power tool housing.

As well, vibration dampening structures of other power tools included separate components used throughout the interior of the housing. Such structures required fasteners in order to attach the vibration dampening members to either the housing or the motor. The use of these multiple components increased the cost and complexity of assembling the power tool.

SUMMARY

In order to overcome the above disadvantages of the prior art, the present application provides, in an embodiment, a power tool comprising a tool housing having a first member and a second member, each including interior and exterior surfaces and inlet or outlet air ports. A motor may be disposed in the tool housing and include a motor housing having an external surface and inlet air vents for the passage of cooling air into the motor and air exhaust vents for the passage of warmed exhaust air from the motor. The inlet and exhaust vents may open at the external surface and the air exhaust vents may be spaced from the inlet air vents. A boot may be resiliently coupled to the external surface and have a radial flange disposed between the inlet air vents and the air exhaust vents. The radial flange may have portions extending to and coupled between the first and second members to provide vibration dampening and to form a barrier between the inlet and air exhaust vents to substantially prevent exhaust air from the air exhaust vents from entering the inlet air vents.

In an embodiment, the radial flange may act to substantially prevent exhaust air from passing through to other portions of the tool, wherein the air exhaust vents and the air exhaust ports are disposed on opposite sides of the radial flange. In an embodiment, the radial flange is received by a seat formed by the interior surface of each of the first and second member. In an embodiment, the boot may be formed of an elastomeric material. In an embodiment, the boot may include a body connecting the radial flange to the motor housing. In an embodiment, the body may include apertures respectively aligned with the air exhaust vents. In an embodiment, the motor housing may have substantially cylindrical housing sidewalls and the body may include a substantially cylindrical body sidewall disposed about the housing sidewall. In an embodiment, the motor housing may have a first end of the cylindrical housing sidewall and the body may have an annular flange connected to the body sidewall and disposed about the peripheral edge of the motor housing first end. In an embodiment, the external surface of the motor housing, the radial flange and a portion of the tool housing including the air exhaust ports cooperate to form a compartment which vents exhaust air to the environment through the outlet air ports. In an embodiment, the motor is an electric motor.

In a further embodiment, a power tool is provided comprising a housing having two halves each including a seat formed within an interior and each seat aligned when the two housing halves are mounted together. A motor may be mounted within the housing and the motor may have a first end and a second end. A boot is provided having a radial flange received within each seat when the two housing halves are mounted together. The boot may be mounted to the first end of the motor to provide for vibration dampening. In an embodiment, the motor may include an air inlet vent and an air exhaust vent and a boot may be oriented so that the flange is located between the air inlet vent and the air exhaust vent in order to substantially separate air of the air inlet vent from the air of the air exhaust vent when the two housing halves are mounted together.

In an embodiment, the air inlet vent may be at the first end of the motor and the boot may be mounted on the first end. The boot may include an aperture adjacent the air inlet vent. In an embodiment, the boot may be substantially cylindrically shaped and have a first end forming a hole, a body and a base having the flange protruding therefrom and an aperture formed in the body. In an embodiment, the boot may include an inner diameter of the body approximately equal to an outer diameter of the first end of the motor so that the boot may be slid over the motor first end providing a friction fit thereto. In an embodiment, the cylindrical hole includes an inner diameter approximately equal to an outer diameter of a protruding ring formed at a first end of the motor so that the boot may be slid over the motor first end providing a friction fit thereto.

In an embodiment, the boot may include a wire management slot formed in the flange in order to capture a wire passing therethrough. In an embodiment, the boot may be formed of a flexible resilient elastomeric material. In an embodiment, the boot may form a barrier to substantially prevent exhaust air from an outlet air vent of the motor from entering an inlet air vent of the motor. In an embodiment, the seat of each housing half may be formed by a first rib and a second rib and the first rib having a diameter less than the second rib.

In an embodiment, the first and second rib are semi-circular in shape. In an embodiment, the second rib forms a hexagonal shape when the housing halves are mounted together and the second rib is aligned with the corresponding rib on the opposite housing half. In an embodiment, the first rib abuts against a side of the flange and the second rib abuts against an outer edge of the flange in order to provide a substantially airtight seal around the boot when the two housing halves are mounted together. In an embodiment, a first compartment of the housing is formed adjacent the first rib and a second compartment of the housing is formed adjacent the second rib and upon mounting of the boot within the seat, the first compartment is substantially sealed from the second compartment when the two housing halves are mounted together.

In an embodiment, the motor includes an air exhaust vent located within the first compartment and an air inlet vent located in the second compartment so that air of the air inlet vent is substantially separated from air of the air exhaust vent when the two housing halves are mounted together. In an embodiment, the motor may include a second boot attached to the second end of the motor. In an embodiment, the second boot is mounted in a second seat formed by a third and fourth rib of the housing. In an embodiment, the first compartment is formed between the first boot and the second boot and a third compartment is formed adjacent the second boot, opposite the first compartment. In an embodiment, the first boot is symmetrical to the second boot.

In an additional embodiment, an air sealing, vibration dampening boot for a power tool is provided, the boot comprising a cylindrical body formed of a resilient elastomeric material forming a body including a radial flange protruding therefrom and a wire management slot formed in the flange for receiving wires therethrough and the flange formed to be received within a seat of a housing in order to secure the boot therein and provide for a sealed mounting and vibration dampening. In an embodiment, the boot may include at least one aperture for air passage.

In an embodiment, the boot may be substantially cylindrically shaped and have a hole formed in a body and an aperture formed in the body. In an embodiment, the boot may include an inner diameter of the body approximately equal to an outer diameter of the first end of the motor so that the boot may be slid over the motor first end providing a friction fit thereto. In an embodiment, the cylindrical hole includes an inner diameter approximately equal to an outer diameter of a protruding ring formed at a first end of the motor so that the boot may be slid over the motor first end providing a friction fit thereto. In an embodiment, the boot includes a wire management slot formed in the rib in order to capture a wire passing therethrough. In an embodiment, the boot is formed of a flexible resilient elastomeric material.

In a further embodiment, a method of assembling a power tool is provided comprising the steps of providing a pair of housing halves each having a seat, attaching a boot having a cylindrical cup shape to a first end of a motor and having a radial flange protruding therefrom, engaging the flange in the seat by mounting the motor within a first housing half and mounting a second housing half to the first housing half so that the motor and boot are trapped therebetween and the flange received in the seat provides for vibration dampening and an air seal within the power tool. In an embodiment, the method may further comprise the steps of attaching a second boot to a second end of the motor and trapping the second boot within a second seat formed by the first housing half and the second housing half. In an embodiment, the method may further comprise the step of trapping a side of the flange attached to a first rib protruding from the housing interior and supporting an edge of the flange against a second rib protruding from the housing interior where the first and second ribs are adjacent and form the seat. In an embodiment the method may further comprise the step of orienting a wire of the power tool within a wire management slot provided within the flange and a seat slot provided by the seat.

In an additional embodiment, a power tool may be provided comprising a housing having two halves each including a means for mounting a member therein. A means for mounting a motor is provided. A means for vibration dampening and sealing the interior of the housing is provided so that upon mounting of the two housing halves together a sealed barrier is formed between an air inlet and an air outlet vent of the motor to substantially prevent exhaust air from the outlet air vent from entering the inlet air vent. In an embodiment, the mounting member means may include a seat formed in each of the two housing halves. In an embodiment, the motor mounting means may include a boot frictionally fit to an end of the motor and the boot having a radial flange for connecting to the interior of the housing via the seat. In an embodiment, the vibration dampening and sealing means may include a boot having a radial flange to be received by the seat.

The power tool with air seal and vibration dampener consists of certain novel features and a combination of parts hereinafter fully described, illustrated in the accompanied drawings, and particularly pointed out in the appended claims, it being understood that various changes in the details may be made without departing from the spirit, or sacrificing any of the advantages thereof.

BRIEF DESCRIPTION OF THE DRAWINGS

For the purpose of facilitating an understanding of the subject matter sought to be protected, there are illustrated in the accompanied drawings embodiments thereof, from an inspection of which, when considered in connection with the following description, the subject matter sought to be protected, its construction and operation, and many of its advantages should be readily understood and appreciated.

DETAILED DESCRIPTION

Figure 2:
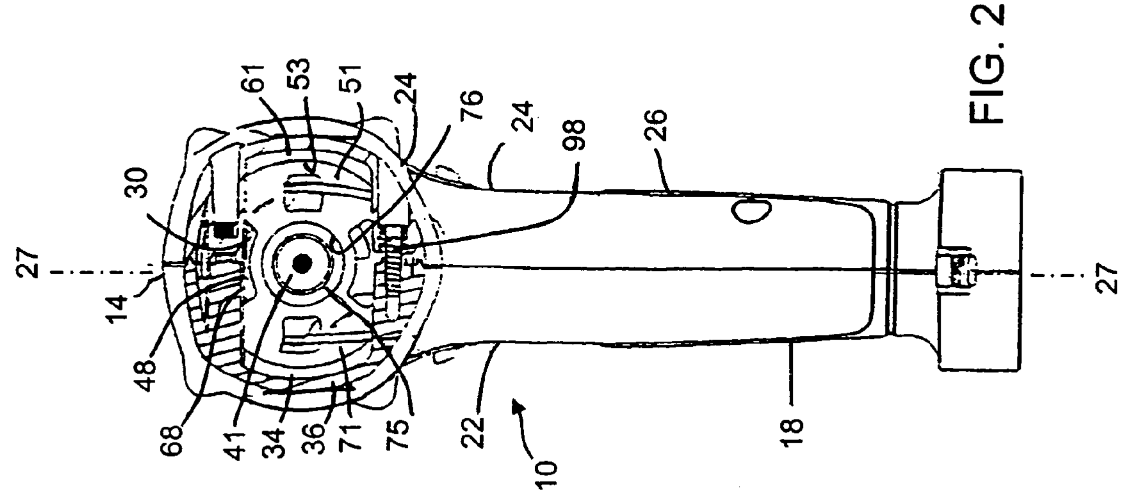
FIG. 2 is an end view of the impact wrench depicted in FIG. 1 having a portion cut away at line 2—2 from FIG. 1.
Figure 1:
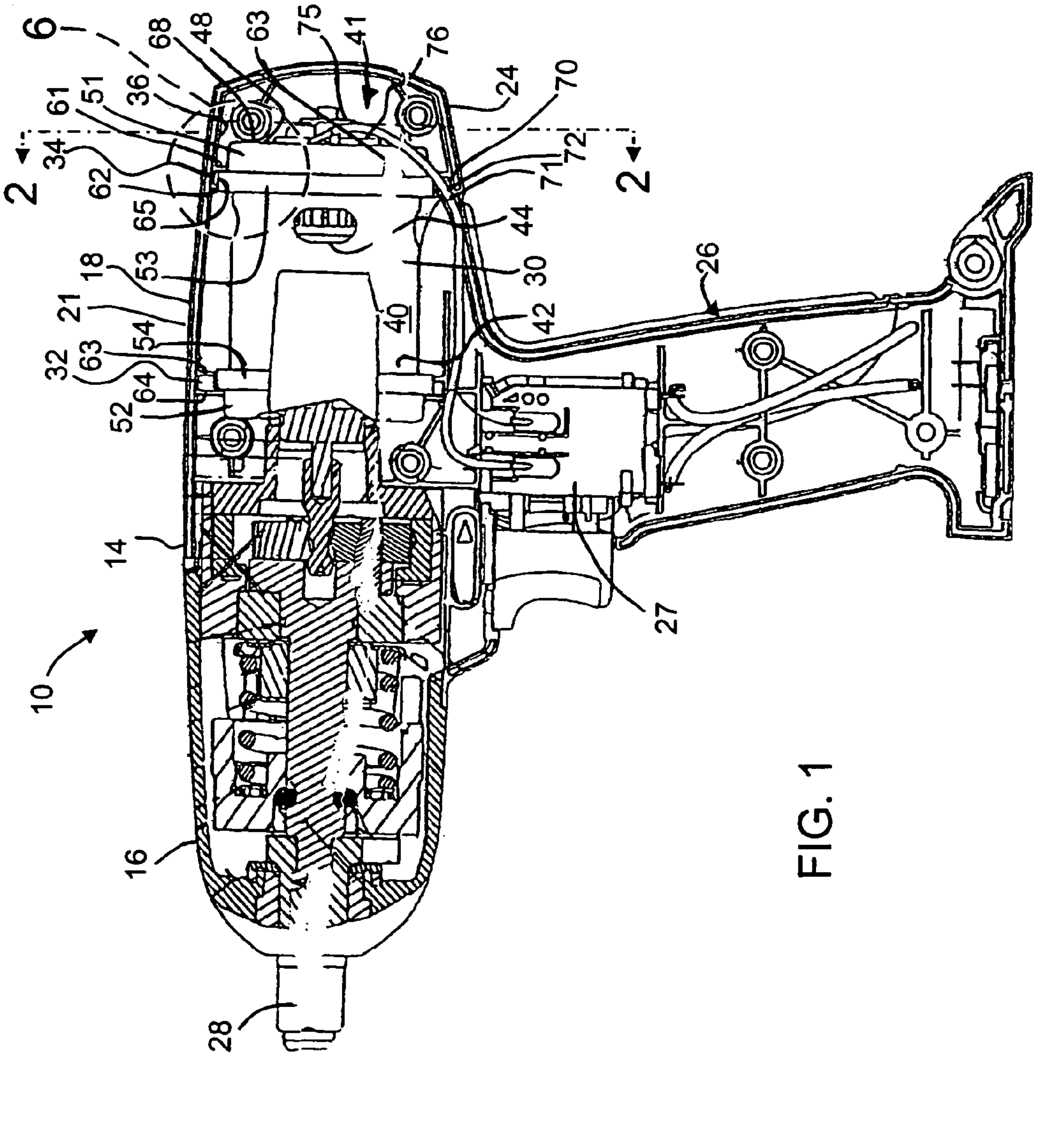
FIG. 1 is a side elevation partially cut away view of an impact wrench in accordance with the present application.

Referring to FIGS. 1 and 2, a power tool in the form of a battery-operated impact wrench 10 is illustrated. The tool 10 includes a tool housing 14 having a front housing part 16 and a rear housing part 18. In an embodiment, the housing is formed of a hard plastic material. In an embodiment, the rear housing 18 is formed of a first housing half 21 and a second housing half 22. Each housing half 21, 22 is substantially identical to the other half so that when each half is mounted together, a complete rear housing 18 is assembled that forms a generally cylindrical shape at the upper body 24; and also upon mounting of the two halves 21, 22 together a handle 26 is formed which is also substantially cylindrical in shape and encloses trigger switch 27. In an embodiment, the housing 18 is formed by each housing half formed by a plane cutting through the longitudinal axis 27 of the entire tool 10. Following assembly of the first housing half 21 to the second housing half 22, the front housing 16 is attached thereto. The front housing 16, in an embodiment, is not halved; but is a one piece construction having a generally cylindrical shape. The front housing 16 includes mechanical components in order to provide for the rotation of the output shaft 28. The output shaft 28 is driven by electrical motor 30 which is mounted within the rear housing 18, which will be described in more detail below. In an alternate embodiment the housing 14 may be formed of a first member and a second member which are not halves of the housing 14. For example, the first member may form a front section of the tool 10 having a substantially cylindrical exposed first edge formed perpendicular to the longitudinal axis of the tool 10. The first edge may be mated to a correspondingly shaped edge of a second member, forming a rear section or middle section of the tool. Each edge may include a seat or other mounting means for trapping a boot therebetween.

Each housing half 21 includes a front seat 32 and a rear seat 34. Each seat 32, 34 is formed from and protrudes from the interior surface 36 of the housing 18. The motor 30 has a substantially cylindrical sidewall and includes a first end 41 and a second end 42. The motor 30 includes an air exhaust vent 44. In an embodiment, a plurality of exhaust vents 44 are provided on an external surface sidewall 46 of the motor 30. An air inlet vent 48 is provided at the first end of the motor 41. In an embodiment, the air inlet vent 48 receives ambient air which is sucked into the motor 30 and hot air is vented from the exhaust vent 44.

A first boot 51 is mounted at the first end 41 of the motor 30 and a second boot 52 is mounted at the second end 42 of the motor 30. Each boot 51, 52 includes a radial flange 53, 54. The flange 53, 54 of each boot 51, 52 is received in the seat 32, 34. Each boot in an embodiment is cylindrical in shape. Likewise, each seat 34, 32 is semi-circular in shape. Upon assembly of the first housing half 21 to the second housing half 22, the corresponding seat on the second housing half 22 mates to each seat 32, 34 of the first housing half 21; so that in an embodiment, a complete circular seat is formed to receive the circular flange 53, 54 of each boot 51, 52. The clamshell effect, of the housing halves capturing the flanges 53, 54 of the boots 51, 52 between the first housing half 21 and the second housing half 22, provides for a secured mounting of the motor 30 within the housing 18 and simultaneously forms a substantially airtight barrier.

Figure 6:
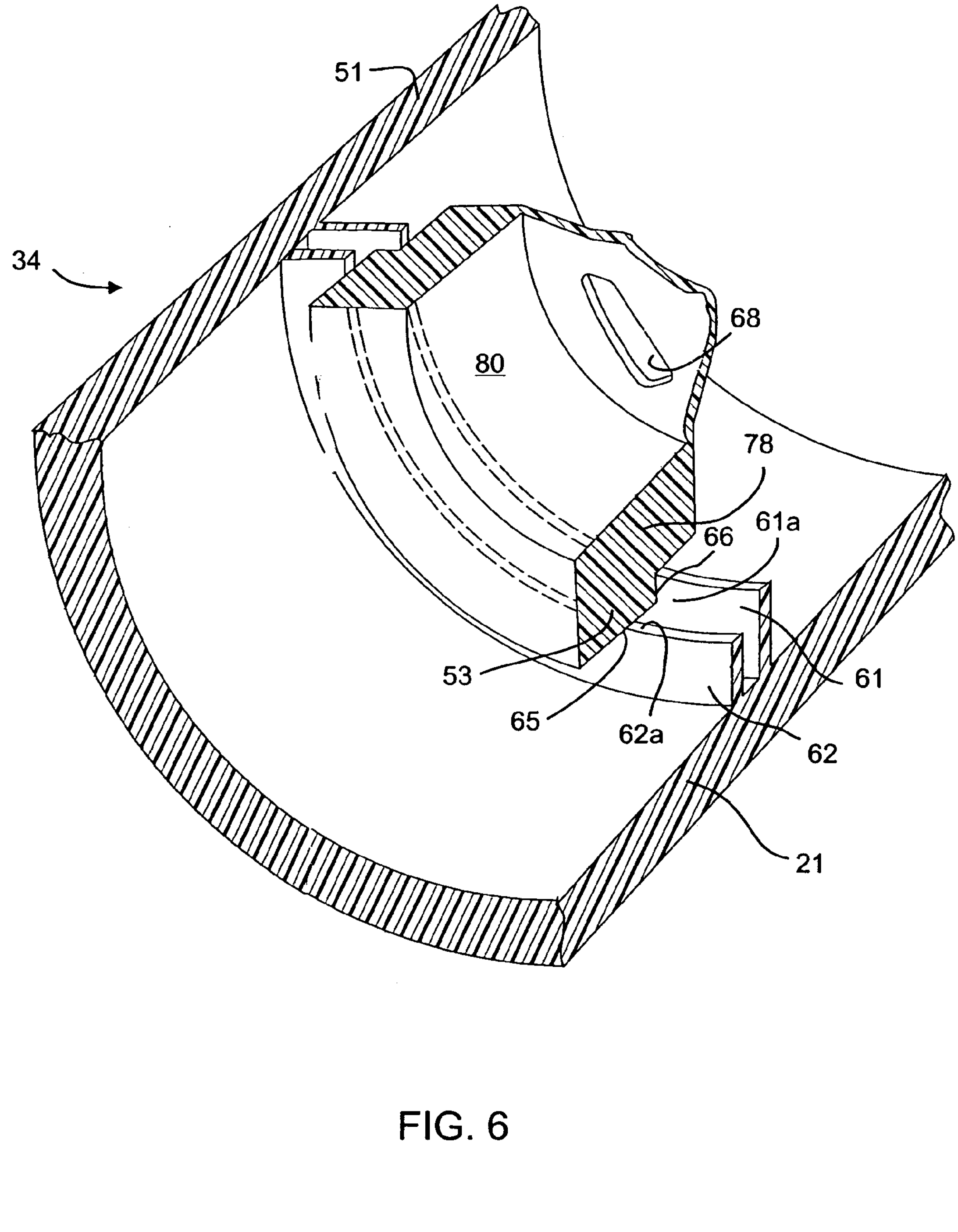
FIG. 6 is an enlarged perspective view of section 6 of FIG. 1.

Referring to FIGS. 1, 2 and 6 (FIG. 6 is a perspective view of the boot 51 disposed against seat 34. The fragmentary view of the boot 51 is without a motor 30 mounted therein) the seat 34 includes a first rib 61 and a second rib 62. In an embodiment, the first rib 61 abuts against a side 66 of the flange in order to retain the boot 51 and motor 30 axially. The second rib 62 abuts against an outer edge 65 of the flange 53 in order to retain the boot 51 and motor 30 laterally within the housing 18. In an embodiment, the boot 51, 52 is formed of a resilient material. For example, an elastomeric material such as thermoplastic composition such as one made by Advanced Elastomer Systems under the trade name Santoprene. The flexible and resilient nature of the flange 53, 54 within the seats 32, 34 and abutting against the first rib 61 provides for an airtight seal of the boot 51, 52 against the interior surface 36 of the housing 18.

Similar to the rear seat 34, the front seat 32 includes a third rib 63 and a fourth rib 64. In an embodiment, the first rib 61 has a diameter that is less than the diameter of the second rib 62. Likewise, the third rib 63 has a diameter that is greater than the diameter of the fourth rib 64. In other words, the first rib 61 and fourth rib 64 protrude into the interior of the housing a greater distance than the second rib 62 and third rib 63. The stepwise orientation of the first rib 61 with respect to the second rib 62 and third rib 63 with respect to the fourth rib 64 helps to provide for sealed barriers and air tight seats 34, 32 respectively when the flanges 53, 54, respectively are received therein. The flanges 53, 54 being captured within the seats upon assembly of the first housing half 21 to the second housing half 22 simultaneously provides vibration dampening of the motor 30. As discussed above the motor 30 includes air inlet vent 48. The boot 51 includes an aperture 68 located adjacent the air inlet vent 48 so that air may be sucked through the boot 51 to the air inlet vent 48 and into the motor 30. In an embodiment, multiple apertures 68 are provided on the boot 51.

In an embodiment, the flange 53 includes a wire management slot 70 which allows for wires 71 to be received, retained, controlled and fed therethrough. The seat 34 also includes a seat slot 72 for receiving, retaining, controlling and allowing for wires 71 to pass therethrough. In an embodiment, the slots 70, 72 are the only area where air leakage can occur. In an embodiment, the slots 70, 72 are formed as narrowly as possible to match the gauge of the wires 71 to be inserted therethrough. In an alternate embodiment, a slit may be formed in the flange 53 through which wires 71 may be threaded in order that the edge of the slit closely surround the wires 71 so that an air tight seal is maintained 360° around the flange 53.

The motor 30 includes a protruding ring 75 formed at the first end 41. The ring 75 has an outer diameter that is approximately equal to the inner diameter of a hole 76 formed in the boot 51. In an embodiment, the boot 51 is slid over the first end 41 of the motor and a friction fit is provided by the hole 76 around the protruding ring 75 of the motor 30 and the boot body disposed about the motor sidewall 46.

Figure 3:
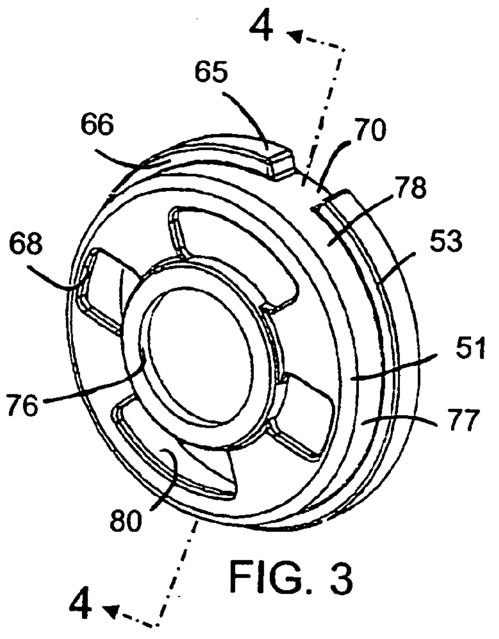
FIG. 3 is a perspective view of a boot of the present application.
Figure 4:
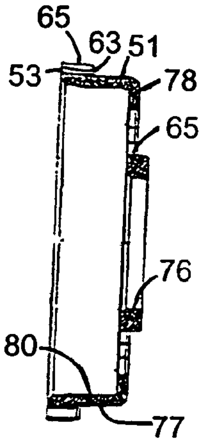
FIG. 4 is a side elevation cut-away view taken at line 4—4 of the boot depicted in FIG. 3.

With respect to FIGS. 3, 4 and 6, a boot 51 is shown having a radial flange 53 extending substantially around the entire circumference of the boot 51, except for a portion which forms a wire management slot 70. The slot 70 allows for wires to be organized received, retained, controlled and maintained next to the body 78 of the boot 51 and to isolate and reduce vibration of the wires 71. In an embodiment the flange 53 has an axial length of its outer edge 65 that is approximately one third of the total axial length of the side 77 of the body 78 of the boot 51. This substantial width of the flange 53 aids in providing improved vibration dampening due to the substantial volume of resilient material of the flange 53 captured within the seat 32 and disbursing the vibrational energy transmitted by the motor through the body of the boot 51. In an embodiment, the body 78 forms in its interior 80 a cup-like shaped sidewall. In an embodiment, the cup shape includes an inner diameter that is approximately equal to the external surface 46 diameter of the motor 30 sidewall so that the cup shape may be friction fit around the first end 41 and around the sidewall of the motor 30 (not shown in FIGS. 3, 4 or 6). The cup shaped body 78 and flange 53 provide for vibration dampening when the side 66 of the flange abuts the first rib 61 and the flange outer edge 65 abuts the second rib of the seat 34. The flange 53, in an embodiment, is pressed into the seat with at least approximately 1 pound of force when the first housing half 21 is attached to the second housing half 22, trapping and securing the boot 51 therein and causing compression of the flange 53 of about 0.010 inch on the diameter. As well, the body 78 includes cylindrical hole 76 formed in the body 78 of the boot 51.

In an embodiment, the cylindrical hole 76 includes an inner diameter that is approximately equal to the outer diameter of the protruding ring 75 of the motor 30 so that a friction fit is provided when the boot is placed on the motor 30. Apertures 68 are formed within the body 78 of the boot 51 and provide for the passage of air to the air inlet vent 48 of the motor 30. In an embodiment, the boot 51 includes four apertures 68. In an embodiment two apertures provide for air passage and two apertures allow for members to protrude from the motor such as electrical contact posts. In an embodiment, the rear boot 51 is shaped similar to the front boot 52.

Figure 5:
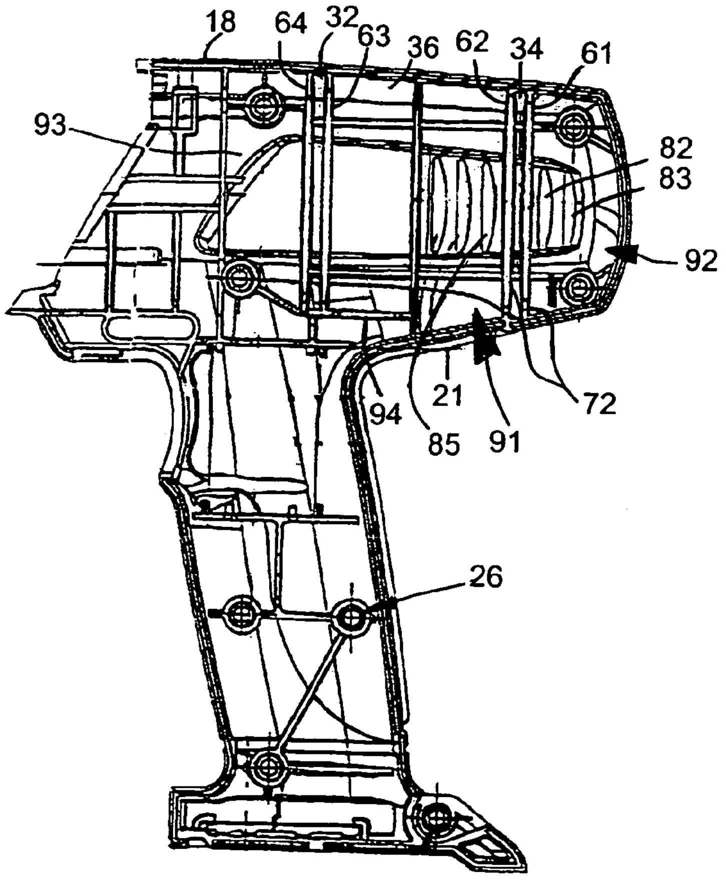
FIG. 5 is a side elevation view of a housing half of the impact wrench depicted in FIG. 1.

Turning to FIG. 5, the rear housing 18 is shown with all components removed therefrom. The housing 18 includes front seat 32 and rear seat 34. In an embodiment the rear seat 34 is formed by the first rib 61 and second rib 62. The front seat 32 is formed by the third rib 63 and fourth rib 64. However, it is noted that the seats 32, 34 may have any shape including, for example, a three sided U-shape or a two sided L-shape. In an embodiment as shown in FIG. 6, the flange 53 abuts against two orthogonal surfaces of the ribs—the radial surface 61*a* of first rib 61 and the distal surface 62*a* of second rib 62—and is trapped therein when the two housing halves 21, 22 are secured together. The orthogonal surfaces 61*a*, 62*a* provide an abutment area at which corresponding orthogonal surfaces of the flange are orthogonally disposed against the seat 34. Therefore, a seat having at least two abutment surfaces having any shape or construction will provide an area to receive the flange 53 in order to provide vibration dampening and a substantially air tight barrier or gasket.

In an embodiment, the ribs 61, 62, 63, 64 form semicircles within the interior 46 of the housing 18. The semicircular shape of the ribs 61, 62, 63, 64 are shaped to match the cylindrical exterior of the flanges 53, 54 which are mounted therein. However, in an alternate embodiment, at least one of the ribs may have a square, flat sided or other polygonal shape such as hexagonal, in order to engage the boot and enhance the axial gripping of the seat 32, 34 on the flanges 53, 54. In addition, the flange 53, 54 may be shaped other than circular, such as a polygonal shape in order to provide axial gripping of the boot 51, 52 within the housing 18. It is to be understood that the complete circular or polygonal shape of each rib 61, 62, 63, 64 is formed when the corresponding rib of the second housing half 22 is mounted to the first housing half 21. In an embodiment, the abutment surface of the ribs 61, 62, 63, 64 are continuous except for seat slot 72 formed to control and permit wires 71 to protrude therethrough.

The housing 18 includes air inlet ports 82, 83 and air exhaust ports 85 formed in its exterior surface. The seat 34 separates the air inlet ports 82, 83 from the air exhaust ports 85. A first compartment 91 is formed adjacent the second rib 62 and contains therein exhaust ports 85. A second compartment 92 is formed adjacent the first rib 61 and includes therein inlet ports 82, 83. It may be understood that upon placement of the boot 51 within seat 34 an airtight seal is provided in order to separate first compartment 91 from second compartment 92 so that the warm air exhausted from exhaust vent 44 of the motor 30 will be retained within first compartment 91 and exit exhaust ports 85. Due to the substantially airtight sealed barrier provided by the boot 51, the warm exhaust air of the first compartment 91 will not mix with the ambient air received within the second compartment 92 to be sucked into the motor through air inlet vent 48. The housing 18 also includes sealing wall 94 which helps retain the air within the first compartment 91 and prohibits it from traveling to other interior portions of the housing such as within the handle 26. It may also be understood that upon mounting of the second boot 52 within front seat 32 the first compartment 91 may be isolated and sealed from a third compartment 93 if desired.

Therefore, it may be understood that, in an embodiment, due to the unitary, one-piece design of the boot 51, 52 having a flange 53, 54 and being received within seats 32, 34 of the housing; it provides for both a substantially airtight seal and also excellent vibration dampening. The use of an elastomeric material for the boot 51 allows for the boot 51, 52 at each end of the motor 30 to absorb vibrations produced by the motor 30 and dampen and cushion the effect of the vibrations, axial movement and radial motor torque and isolate those vibrations from the housing 18 of the power tool 10. The one-piece design of the boot 51 having the precision formed inner diameter cup shape and cylindrical hole corresponding to the outer diameter of the external surface 46 of the motor 30 and the protruding ring 75 allow for a friction fit of the boot 51 thereto; without the need of fasteners or other attachment means. The one-piece boot 51 having a radial flange 53 captured and pinched between the two housing halves, provides for a quickly and easily assembled power tool with only the boot 51 required to provide the mounting features for the motor 30 within the housing 18. Testing has shown the present design provides for better air sealing than prior designs and will increase motor and trigger switch life by controlling temperature and provides for more comfortable operation by a user. In fact testing has shown a decrease in temperature of the handle 26 by 17%, the trigger switch 27 by 26% and the motor 30 by 36% compared to previous power tools. The boot 51 also helps to absorb tolerance stack-up of internal parts due to its resilient nature and provides for tightly packaged internal components of the power tool 10. The boot 51 helps to absorb impact on the tool 10 if it is dropped.

In an embodiment, the assembly of the power tool 10 includes providing the first housing half 21 having seats 32, 34 provided therein. In an embodiment, the seats are integrally molded with the entire first housing half 21. However, alternate embodiments would allow for separate members to be inserted to form the seats 32, 34. Boots 51, 52 are provided which are slid onto and friction fit to the first end 41 and second end 42 of the motor 30. Wires 72 are soldered to the first end of the motor 30. The wires 72 are oriented within the slot 70 of the flange 53. The flange 53, 54 of each boot 51, 52 is oriented within the corresponding seat 32, 34 in order to mount the motor 30 within the housing 18. The wires 71 are then located within the seat slot 72 of seat 34.

In an embodiment, the first boot 51 and second boot 52 are similar in construction in order to reduce manufacturing costs. Likewise, the shape of the first end and second end of the motor 30 are very similar so that the friction fit of the boots 51, 52 may be obtained at each end 41, 42 of the motor 30. After assembly of the other internal components within the housing 18, the second housing half 22 is then mounted to the first housing half 21. The first housing half and second housing half 22 are then secured together using fasteners 98. The boots 51, 52 will then be captured between the two housing halves and an airtight seal will be formed by the flanges 53, 54 of each boot 51, 52 being received and snugly fit against the first rib 61 and fourth rib 64 in order to provide a first compartment 91 sealed and airtight from the second compartment 92 and third compartment 93.

The matter set forth in the foregoing description and accompanied drawings is offered by way of illustration only and not as a limitation. While particular embodiments have been shown and described, it will be obvious to those skilled in the art that changes and modifications may be made without departing from the broader aspects of applicant's contribution. The actual scope of the protection sought is intended to be defined in the following claims when viewed in their proper perspective based on the prior art.

What is claimed is:

1. A power tool comprising:

a tool housing including first and second housing members, each including interior and exterior surfaces;

a motor disposed in the tool housing and including a motor housing having an external surface and air inlet vents for the passage of cooling air into the motor and air exhaust vents for passage of warmed exhaust air from the motor, the air inlet and air exhaust vents opening at the external surface, the air exhaust vents being spaced from the air inlet vents; and a boot including a body having a circular cross section and an interior surface that corresponds generally to a shape of the external surface of the motor and at least a portion of the interior surface resiliently coupled to the external surface of the motor and the body being disposed between the air inlet vents and the air exhaust vents, the boot having a radial flange mounted in a seat formed by the interior surface of one of the first and second housing members, the flange having a circumferential outer edge that abuts against the seat so that the boot is disposed between the seat and the motor in order to provide vibration dampening for the motor and to form a barrier between the air inlet and air exhaust vents to substantially prevent exhaust air from the air exhaust vents from entering the air inlet vents.

2. The tool of claim 1, wherein the radial flange is disposed against the interior surface of the tool housing and acting to substantially prevent exhaust air from passing therethrough to other portions of the tool, wherein the air exhaust vents and the air inlet vents are disposed on opposite sides of the boot.

3. The tool of claim 1, wherein the boot is formed of an elastomeric material.

4. The tool of claim 3, wherein the boot includes the body connecting the radial flange to the motor housing.

5. The tool of claim 4, wherein the body includes apertures respectively aligned with the air inlet vents.

6. The tool of claim 5, wherein the motor housing has a substantially cylindrical housing sidewall and the body of the boot includes a substantially cylindrical body sidewall disposed about the housing sidewall of the motor.

7. The tool of claim 6, wherein the motor housing has a first end of the cylindrical housing sidewall and the body has the radial flange connected to the body sidewall and disposed about peripheral edge of the motor housing first end.

8. The tool of claim 7, wherein the external surface of the motor housing, the radial flange and a portion of the tool housing including air exhaust ports cooperate to form a compartment which vents exhaust air to the environment through the air exhaust ports.

9. The tool of claim 1, wherein the motor is an electric motor.

10. A power tool comprising:

a housing having two halves each including a seat formed within an interior of the housing, the seats being aligned when the two housing halves are clamped and mounted together and the aligned seats laterally circumscribe the interior;

a motor mounted within the housing, the motor having a first end and second end;

a boot mounted to the first end of the motor, the boot having a flange disposed in each seat and each seat formed to provide for vibration dampening for the motor, and the motor includes an air inlet vent and an air exhaust vent and the boot is oriented so that the flange is located between the air inlet vent and the air exhaust vent in order to form a barrier and substantially separate air of the air inlet vent from air of the air exhaust vent when the two housing halves are mounted together.

11. The power tool of claim 10 wherein the air inlet vent is at the first end of the motor, the boot is mounted on the first end and the boot includes an aperture adjacent the air inlet vent.

12. The power tool of claim 11 wherein the boot is substantially cylindrically shaped having a first end forming a hole, a body and a base having the flange protruding therefrom and the aperture formed in the body.

13. The power tool of claim 12 wherein the boot includes an inner diameter of the body approximately equal to an outer diameter of the first end of the motor so that the boot may be slid over the motor first end providing a friction fit thereto.

14. The power tool of claim 12 wherein the hole includes an inner diameter approximately equal to an outer diameter of a protruding ring formed at a first end of the motor so that the boot is slid over the motor first end providing a friction fit thereto.

15. The power tool of claim 12 wherein the boot includes a wire management slot formed in the flange in order to capture a wire passing therethrough.

16. The power tool of claim 12 wherein the boot is formed of a flexible resilient elastomeric material.

17. The power tool of claim 12 wherein the boot forms a barrier to substantially prevent exhaust air from the air exhaust vent of the motor from entering the air inlet vent of the motor.

18. The power tool of claim 10 wherein the seat of each housing half is formed by a first rib and a second rib and the first rib having a diameter less than the second rib.

19. The power tool of claim 18 wherein the first and second rib are semi-circular in shape.

20. The power tool of claim 18 wherein the second rib forms a polygonal shape when the housing halves are mounted together and the second rib is aligned with a corresponding rib on an opposite housing half.

21. The power tool of claim 18 wherein the first rib includes a radial surface that abuts against a side of the flange and the second rib includes a distal surface that abuts against an outer edge of the flange in order to provide for an orthogonal abutment of surfaces of the boot against the seat to provide a substantially air tight seal around the boot when the two housing halves are mounted together.

22. The power tool of claim 18 wherein a first compartment of the housing is formed adjacent the first rib and a second compartment of the housing is formed adjacent the second rib and upon mounting of the boot within the seat the first compartment is substantially sealed from the second compartment when the two housing halves are mounted together.

23. The power tool of claim 22 wherein the motor includes an air exhaust vent located within the first compartment and an air inlet vent located in the second compartment so that air of the air inlet vent is substantially separated from air of the air exhaust vent when the two housing halves are mounted together.

24. The power tool of claim 22 wherein the motor includes a second boot attached to the second end of the motor.

25. The power tool of claim 24 wherein the second boot is mounted in a second seat formed by a third and fourth rib of the housing.

26. The power tool of claim 25 wherein the first compartment is formed between the first boot and second boot and a third compartment is formed adjacent the second boot, opposite the first compartment.

27. The power tool of claim 25 wherein the first boot is symmetrical to the second boot.

28. A method of assembling a power tool is provided comprising the steps of:

providing a pair of housing halves, each having a seat;

attaching a boot having a cylindrical cup shape to a first end of a motor and having a radial flange protruding therefrom;

engaging the flange in each seat by mounting the motor within a first housing half, and mounting a second housing half to the first housing half so that the boot is trapped between each seat and the motor and the flange engaged orthogonally by the seat to provide for vibration dampening and an air seal to create an air barrier between opposing sides of the flange within the power tool; and the motor includes an air inlet vent and an air exhaust vent and the boot is oriented so that the flange is located between the air inlet vent and the air exhaust vent in order to substantially separate air of the air inlet vent from air of the air exhaust vent when the two housing halves are mounted together.

29. The method of claim 28 further comprising the steps of:

attaching a second boot to a second end of the motor; and trapping the second boot within a second seat foamed by the first housing half and the second housing half.

30. The method of claim 28 further comprising the step of:

trapping a side of the flange against a radial surface of a first rib protruding from the housing interior and supporting an edge of the flange against a distal surface of a second rib protruding from the housing interior, where the first and second ribs are adjacent and form the seat.

31. The method of claim 28 further comprising the step of orienting a wire of the power tool within a wire management slot provided within the flange and a seat slot provided by the seat in order to avoid crimping of the wire upon mounting of the first and second housing halves together.

32. A power tool comprising:

a housing including two halves each including a means for mounting a member therein;

a means for mounting a motor; and a means for vibration dampening and sealing the interior of the housing including a means for orthogonally abutting the vibration dampening and sealing means so that upon mounting of the two housing halves together a sealed barrier is formed between an air inlet vent and air outlet vent of the motor to substantially prevent exhaust air from the outlet air vent from entering the air inlet vent.

33. The power tool of claim 32 wherein the mounting means includes a seat formed in each of the two housing halves.

34. The power tool of claim 33 wherein the motor mounting means includes a boot frictionally fit to an end of the motor and the boot having a circular cross-section and a radial flange for connecting to the interior of the housing via the seat.

35. The power tool of claim 33 wherein the vibration dampening and sealing means includes a boot having a circular cross-section and a radial flange to be mounted in the seat.

36. A power tool comprising:

a tool housing including first and second housing members, each including interior and exterior surfaces and at least one air exhaust port;

a motor disposed in the tool housing and including a motor housing having an external surface and air inlet vents for the passage of cooling air into the motor and air exhaust vents for passage of warmed exhaust air from the motor, the air inlet and air exhaust vents opening at the external surface, the air exhaust vents provided in a first compartment being spaced from the air inlet vents provided in a second compartment; and a boot resiliently coupled to the external surface of the motor and being disposed between the air inlet vents and the air exhaust vents, the boot having a flange mounted in a seat formed by the interior surface of one of the first and second housing members to provide vibration dampening and to form a barrier between the air inlet and air exhaust vents to substantially prevent exhaust air from the air exhaust vents from entering the air inlet vents, the boot formed of an elastomeric material and includes a body connecting the flange to the motor housing and apertures respectively aligned with the air inlet vents.

37. The power tool of claim 36, wherein the motor housing has a first end of a cylindrical housing sidewall and radial flange is connected to a body sidewall and disposed about a peripheral edge of the motor housing first end.

38. The power tool of claim 37, wherein the external surface of the motor housing, the radial flange and a portion of the tool housing including the air exhaust ports cooperate to form a compartment which vents exhaust air to the environment through the air exhaust ports.

39. A power tool comprising:

a housing having two halves each including an orthogonal seat formed within an interior, the seats being aligned when the two housing halves are mounted together;

a motor mounted within the housing, the motor having a first end and second end and an air inlet vent and an air exhaust vent;

a boot having a flange disposed in each seat when the two housing halves are clamped and mounted together, the boot mounted to the first end of the motor to provide for vibration dampening, the boot includes an aperture adjacent the air inlet vent and the boot is oriented so that the flange is located between the air inlet vent and the air exhaust vent in order to substantially separate and substantially prevent air of the air inlet vent from entering the air exhaust vent when the two housing halves are mounted together and the air inlet vent is at the first end of the motor; and the motor includes an air inlet vent and an air exhaust vent and the boot is oriented so that the flange is located between the air inlet vent and the air exhaust vent in order to substantially separate air of the air inlet vent from air of the air exhaust vent when the two housing halves are mounted together.

40. The power tool of claim 39 wherein the boot is substantially cylindrically shaped having a first end forming a hole, a body and a base having the flange protruding therefrom and the aperture formed in the body.

41. The power tool of claim 40 wherein the boot includes an inner diameter of the body approximately equal to an outer diameter of the first end of the motor so that the boot may be slid over the motor first end providing a friction fit thereto.

42. The power tool of claim 40 wherein the cylindrical hole includes an inner diameter approximately equal to an outer diameter of a protruding ring formed at a first end of the motor so that the boot is slid over the motor first end providing a friction fit thereto.

43. The power tool of claim 40 wherein the boot includes a wire management slot formed in the flange in order to capture a wire passing there through.

44. The power tool of claim 40 wherein the boot is formed of a flexible resilient elastomeric material.

45. The power tool of claim 40 wherein the boot forms a barrier to substantially prevent exhaust air from the air exhaust vent of the motor from entering the air inlet vent of the motor.

46. A power tool comprising:

a housing having two halves each including a seat formed within an interior, the seats being aligned when the two housing halves are mounted together and the seat of each housing half is formed by a first rib and a second rib and the first rib having a diameter less than the second rib;

a motor mounted within the housing, the motor having a first end and second end;

a boot having a flange disposed in each seat when the two housing halves are mounted together and the boot mounted to the first end of the motor to provide for vibration dampening; and the first rib includes a radial surface that abuts against a side of the flange and the second rib includes a distal surface that abuts against an outer edge of the flange in order to provide for orthogonal abutment of surfaces of the boot against the seat to provide a substantially air tight seal around the boot when the two housing halves are mounted together.

47. A power tool comprising:

a tool housing including first and second housing members, each including interior and exterior surfaces;

a motor disposed in the tool housing and including a motor housing having an external surface and air inlet vents for the passage of cooling air into the motor and air exhaust vents for passage of warmed exhaust air from the motor, the air inlet and air exhaust vents opening at the external surface, the air exhaust vents being spaced from the air inlet vents; and a boot including a body having an interior surface that corresponds generally to a shape of the external surface of the motor and at least a portion of the interior surface resiliently coupled to the external surface of the motor and the body being disposed between the air inlet vents and the air exhaust vents, the boot having an outer edge that abuts against at least a portion of a seat so that the boot is disposed between the seat and the motor in order to provide vibration dampening for the motor and to form a barrier between the air inlet and air exhaust vents to substantially prevent exhaust air from the air exhaust vents from entering the air inlet vents.

48. The power tool of claim 47 wherein the boot includes a flange that is disposed in the seat.

49. The power tool of claim 47 wherein the boot has a circular cross section and a radial flange disposed in the seat.

50. The power tool of claim 47 wherein the seat is formed by a pair of ribs.

51. The power tool of claim 47 wherein the boot is mounted within the housing via a mounting means and without a fastener.

52. A power tool comprising:

a tool housing including first and second housing members, each including interior and exterior surfaces;

a motor disposed in the tool housing and including a motor housing having an external surface and air inlet vents for the passage of cooling air into the motor end air exhaust vents for passage of warmed exhaust air from the motor, the air inlet and air exhaust vents opening at the external surface, the air exhaust vents being spaced from the air inlet vents; and a boot including a body having an interior surface that corresponds generally to a shape of the external surface of the motor and at least a portion of the interior surface resiliently coupled to the external surface of the motor and the body being disposed between the air inlet vents and the air exhaust vents, the boot having a flange mounted in a seat formed by the interior surface of one of the first and second housing members, to provide vibration dampening for the motor and to form a barrier between the air inlet and air exhaust vents to substantially prevent exhaust air from the air exhaust vents from entering the air inlet vents.

* * * * *